United States Patent [19]
Melkus et al.

[11] Patent Number: 5,821,928
[45] Date of Patent: Oct. 13, 1998

[54] METHOD AND SYSTEM FOR CONTROLLING INDIVIDUAL MESSAGES

[75] Inventors: Lovie A. Melkus, Southlake; David J. Schell, Trophy Club, both of Tex.

[73] Assignee: International Business Machines Corporation, Armonk, N.Y.

[21] Appl. No.: 993,225

[22] Filed: Dec. 18, 1992

[51] Int. Cl.⁶ .................................... G06F 3/14
[52] U.S. Cl. ............................................. 345/337
[58] Field of Search ..................... 395/155, 161, 395/156, 157, 159; 345/119, 146, 902, 347, 348, 352, 336, 337, 338, 975

[56] References Cited

U.S. PATENT DOCUMENTS

| | | | |
|---|---|---|---|
| 4,648,062 | 3/1987 | Johnson et al. | 345/338 |
| 4,701,130 | 10/1987 | Whitney et al. | 434/118 |
| 4,789,962 | 12/1988 | Berry et al. | 345/338 |
| 5,018,082 | 5/1991 | Obata et al. | 345/337 |
| 5,029,113 | 7/1991 | Miyoshi et al. | 345/336 |
| 5,157,768 | 10/1992 | Hoeber et al. | 345/338 |
| 5,165,012 | 11/1992 | Crandall et al. | 347/347 |
| 5,175,812 | 12/1992 | Krieger | 345/338 |
| 5,276,801 | 1/1994 | Heyen et al. | 345/501 |
| 5,287,448 | 2/1994 | Nicol et al. | 345/337 |

OTHER PUBLICATIONS

The Speller/Thesaurus chapter of the operation manual for WordPerfect Version 4.2 (1986), pp. 2–15.

*Primary Examiner*—Matthew M. Kim
*Assistant Examiner*—Crescelle N. dela Torre
*Attorney, Agent, or Firm*—Geoffrey A. Mantooth

[57] ABSTRACT

Individual messages that are displayed on a screen are modified to allow a user to select options relating to the future display of the message and, if the message is to be displayed, then the procedure for removing the message from the screen. As a message is displayed, it is provided with an options pushbutton. Selection of the pushbutton provides the display of the options for displaying and removing the message.

7 Claims, 5 Drawing Sheets

Fig. 2

METHOD AND SYSTEM FOR CONTROLLING INDIVIDUAL MESSAGES

FIELD OF THE INVENTION

The present invention relates to methods and systems that provide messages to users of data processing systems.

BACKGROUND OF THE INVENTION

Data processing systems commonly provide messages to a user. Messages provide information to a user such as advising the user of an error condition or informing the user that a task has been completed. For example, electronic mail systems allow one user to send a note to a second user on the data processing system. Whenever a note is sent by the first user, the data processing system displays a message to the first user that says, "Item has been sent". This confirms to the first user that the note was sent to the second user.

Once the message is displayed, it is desired to move the message from the screen in order to avoid cluttering the screen. Most systems require the user to interact with the system to remove a message. For example, after the message "Item has been sent" has been displayed, removing the message from the screen requires the user to either input a keystroke into the system or to use a mouse to position the cursor on a command. After removing numerous messages from their screens on a daily basis, users find this procedure aggravating and tiresome.

Other prior art systems automatically remove messages by replacing old messages with new messages. The messages are displayed in an information area on the screen. The messages change as the user performs other tasks. The problem with these systems is that the messages tend to be so non-invasive that they are often overlooked by a user who might be preoccupied with some other task.

There are prior art systems that allow a user to customize messages to the extent of allowing users to choose if they want specific types of messages to be displayed. For example, a user may elect to have the data processing system display on the screen all informational type messages. The problem with these systems is that a user typically would like to see only some of the available informational type messages. Instead, either all of the informational type messages are displayed or none are displayed. With these prior art systems, there is insufficient selectivity to allow a user to see only specific individual messages.

SUMMARY OF THE INVENTION

It is an object of the present invention to provide a method and system for controlling whether individual messages are displayed on a computer interface.

It is a further object of the present invention to provide a method and system for controlling the removal of individual messages from a computer interface.

The method of the present invention controls individual messages on a data processing system. The data processing system receives message producing actions. The method detects an occurrence of a message producing action and provides a message associated with the detected message producing action to a user. The method provides to the user a selection of whether the message should be provided to the user upon future occurrences of the detected message producing action. The user selection is detected. Upon detections of subsequent occurrences of the message producing action, the user selection is utilized to determine if the message is to be provided to the user.

The data processing system of the present invention includes means for detecting an occurrence of a message producing action. The system has means for providing a message associated with a detected message producing action to a user. The means for providing a message is responsive to the detection of the detected message producing action by the means for detecting. There is a means for providing to the user a selection of whether the message should be provided to the user upon future occurrences of the detected message producing action. The means for providing to the user a selection is responsive to the means for providing the message to the user. There is also a means for controlling the means for providing said message to said user based on the user selection.

Upon the display of an individual message to a user in the normal course of use of a data processing system, the present invention allows a user to determine whether a message is to be displayed in the future. An OPTIONS pushbutton is provided in the message window and is used to display the selections to the user. If the user chooses that the message not be displayed, then future occurrences of the message producing action, which would normally cause the message to be displayed, will result in no display of the message. If the user selects that the message is to be displayed, then the user can choose the procedure for removing the message from the screen. The message can be removed automatically after the message has been displayed for a user selected period of time, or upon the occurrence of a specific or general user action. In this manner, individual messages can be controlled with regard to the display and removal of the messages. The present invention can be easily "retrofitted" into existing message display systems.

DESCRIPTION OF THE PREFERRED EMBODIMENT

Figure 1:
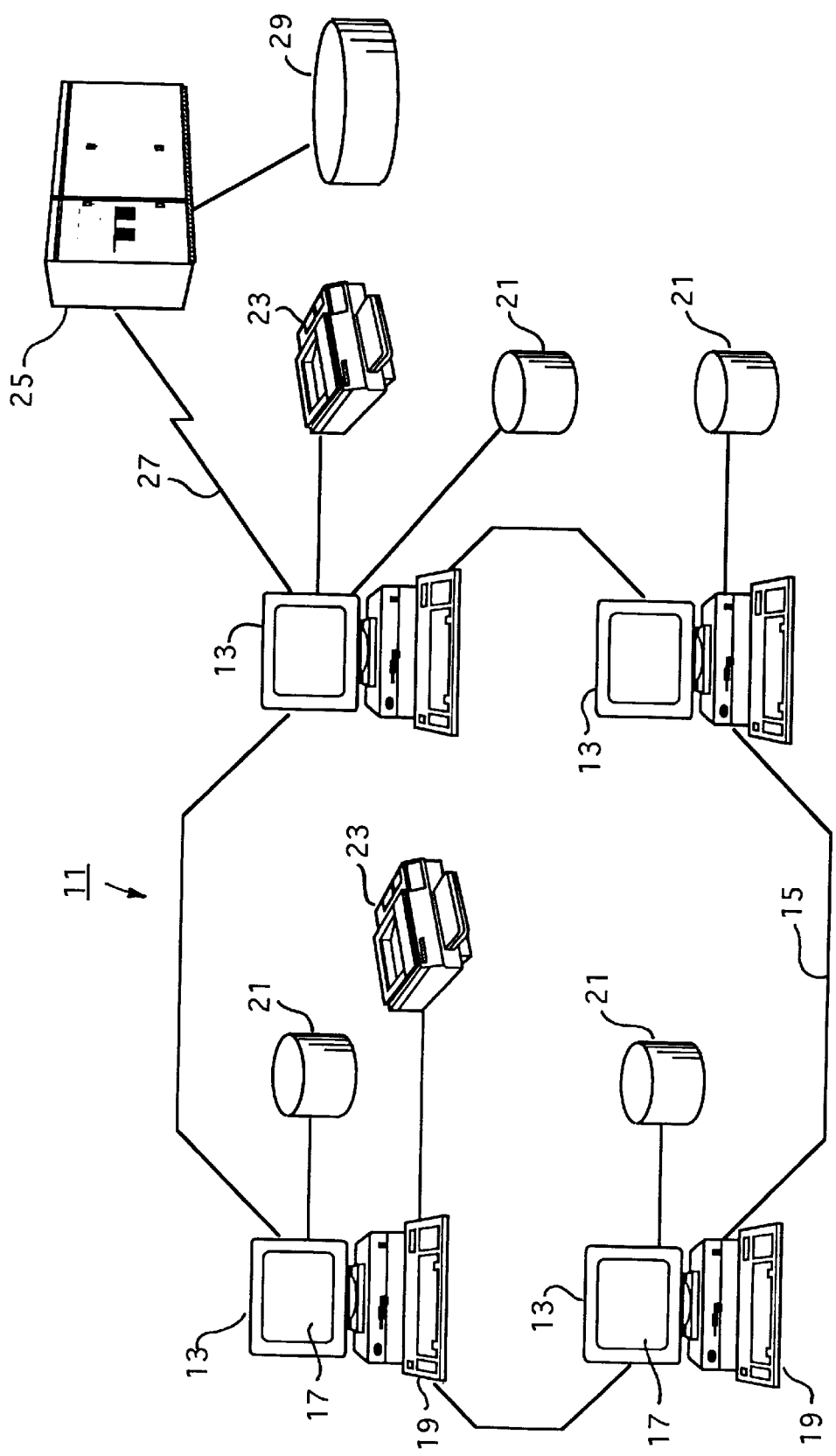
FIG. 1 is a schematic diagram of a data processing system on which the present invention can be practiced.

In FIG. 1, there is shown a schematic diagram of a data processing system 11, upon which the present invention can be practiced. The data processing system 11 includes plural individual computers 13 which are connected together in a local area network (LAN) 15. Each computer 13 includes a user interface, which has a display screen 17 and a keyboard 19. Each computer 13 may also be coupled to a storage device 21 and to a printer or output device 23. One or more of such storage devices 21 may be utilized, in accordance with the present invention, to store applications or resource objects which may be periodically accessed by any user within the data processing system 11.

The data processing system 11 may also include a mainframe computer 25 that is coupled to one of the computers by a communication link 27. The mainframe computer 25 may also be coupled to a storage device 29 which may serve as a remote storage for the computers.

The data processing system 11 displays messages to a user on the display screen 17 whenever the user performs specified actions. For example, when the user sends a note to another user of the data processing system, a message stating that the note has been sent appears on the display screen of the sender. Thus, the data processing system 11 associates a particular message with a particular action performed by a user.

The present invention allows a user to determine whether a particular message will be displayed in the future. If the message is to be displayed, the present invention allows the user to determine how the message is to be removed from the display screen.

Figure 2:
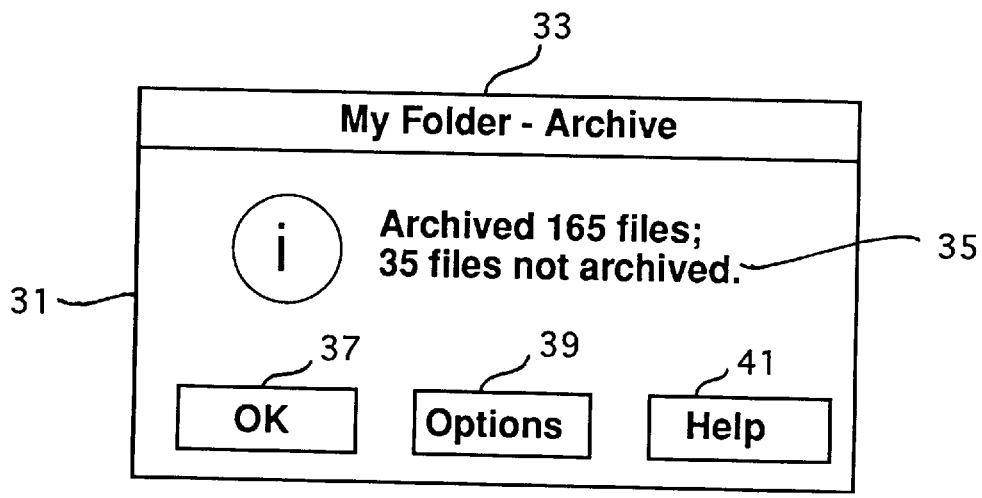
FIG. 2 is a schematic view of a message window, as modified by the present invention, of the type displayed on a computer screen.

Referring to FIG. 2, there is shown an exemplary message window 31 or box that has been modified in accordance with the present invention. The window 31 has a title bar 33, a client area containing the message 35 and pushbuttons 37, 39, 41. The logo "i" within a circle indicates that the message is of the informational type, as opposed to a warning or an action message. The message 35 provides information on the number of files in the user's folder that have been archived. The message 35 is displayed as a result of the user performing a specific action that is associated with the message 35. The pushbuttons are OK 37, OPTIONS 39 and HELP 41. The OK and HELP pushbuttons 37, 41 are conventional. When the message is displayed on the screen, it can be removed by the user selecting the OK pushbutton 37. Alternatively, the user can select the HELP pushbutton 41 to obtain information regarding the message. The pushbuttons are selected by locating the cursor on the desired pushbutton and pressing a keyboard key or a mouse button. By selecting the HELP pushbutton 41, information is given on the options as well as on the message itself.

Figure 3:
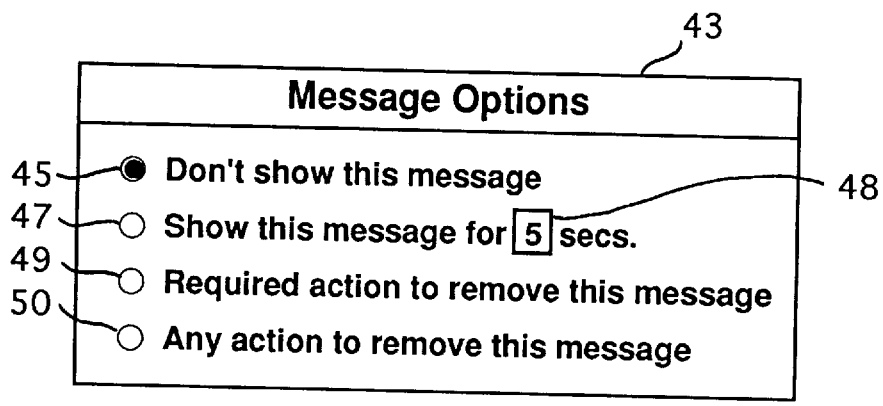
FIG. 3 is a schematic view of a message options window which is displayed by the present invention.

The present invention adds the OPTIONS pushbutton 39 to the message window 31. When the OPTIONS pushbutton 39 is selected, the Message Options window 43 of FIG. 3 is displayed on the screen. The Message Options window presents the user with some choices, only one of which can be selected.

The Message Options window 43 is generic to all messages having the OPTIONS pushbutton 39. Regardless of the message, whenever the OPTIONS pushbutton 39 is selected, the Message Options window 43 will be displayed. However, once the Message Options window 43 is displayed, a selection of one of the options therein by a user affects only the particular message that was used to call to Message Options window. The enables the display and method of removal of individual messages to be controlled by the user.

The first choice 45 in the Message Options window 43 is "Don't show this message". When this choice is selected, the particular message 35 will not be shown the next time the user performs the action that would normally produce the message. If the first choice 45 is not selected, then the particular message 35 will be displayed the next time the user performs the respective message producing action.

If the message 35 is to be displayed, then the user can select the method of removing the message from the screen. The next choice 47 "Show this message for ___ seconds", allows the user to determine how long the message will be displayed, after which it is automatically removed from the screen. If the user input is 5 seconds into the time space 48, then the message 35 will only be displayed for 5 seconds, after which time it will be automatically removed. The next two choices 49, 50 require manual intervention by the user to remove the message. The choice 49, "Required action to remove this message", allows the user to determine if the specific action must be taken before the message is removed.

For example, if choice 49 is selected, then the message of FIG. 2 is removed by selecting the OK pushbutton 37. The last choice 50, "Any action to remove this message", is non-specific in that it allows any key to be pressed to remove the message.

After the user selects a choice, it is stored with the message. Thus, the next time the user performs the action that would normally display the same message 35, the user's choices in displaying and removing would be honored by the data processing system 11. This would continue each time the data processing system seeks to display the message. If the first choice 45 was selected, the message would not be displayed. If one of the other choices 47, 49, 50 was selected, the message would be displayed and removed in accordance with the predetermined method.

The user can change the selected choices. Changing the choices is simplified by the provision of the OPTIONS pushbutton 39 on the message window. Thus, each time the message is displayed, the user can select a new option.

One aspect of the present invention is that the controlling options are provided on each message. Thus, whenever a message is displayed as a result of the respective message producing action, the user can control the message in "real time", or during actual use. This greatly simplifies the control of individual messages, as a data processing system and its programs may have hundreds of message available to the user. Controlling an individual message is most easily achieved as the messages are displayed to the user, thereby allowing the user to see the message in the context in which the message is provided. The contextual information relevant to the particular message can thus be considered by the user when deciding how to control the message.

The method for controlling individual messages in accordance with the present invention will now be described with reference to the flow charts of FIGS. 4A, 4B and 5. In the flow charts, the following graphical conventions are observed: a rectangle for either a process, function or screen display, a subrectangle or diamond for a decision and a circle or ellipse for a connector in exiting to or entering from another part of the flow chart. These conventions are well understood by programmers skilled in the art of data processing and user interfaces and the flow charts are sufficient to enable a programmer skilled in the art to write code in any suitable computer programming language, such as BASIC, PASCAL or C for a computer such as the IBM Personal System/2 (PS/2) family of computers which supports these languages.

Figure 4A:
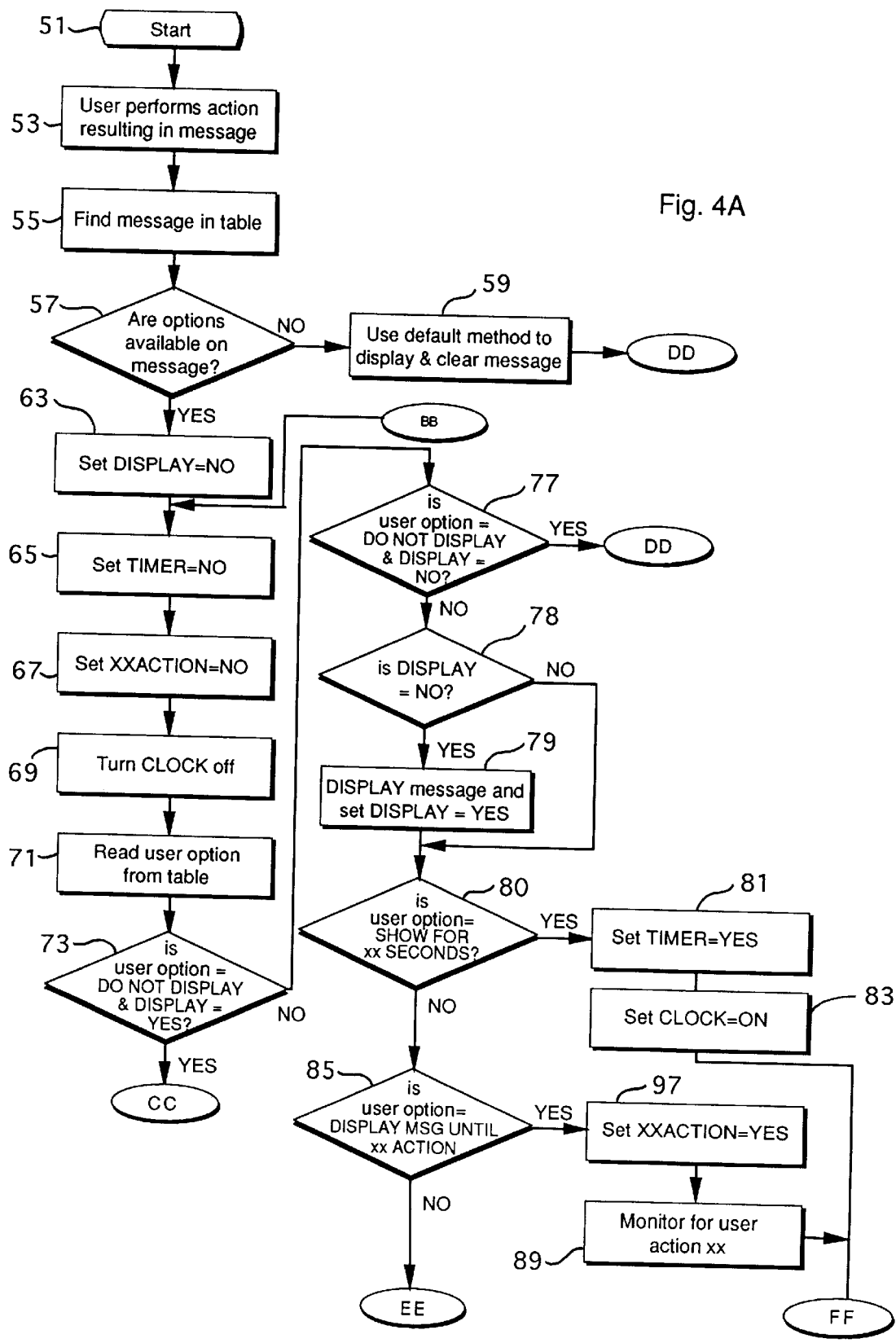
FIGS. 4A, 4B and 5 are flow charts showing the method of the present invention, in accordance with a preferred embodiment.
Figure 4B:
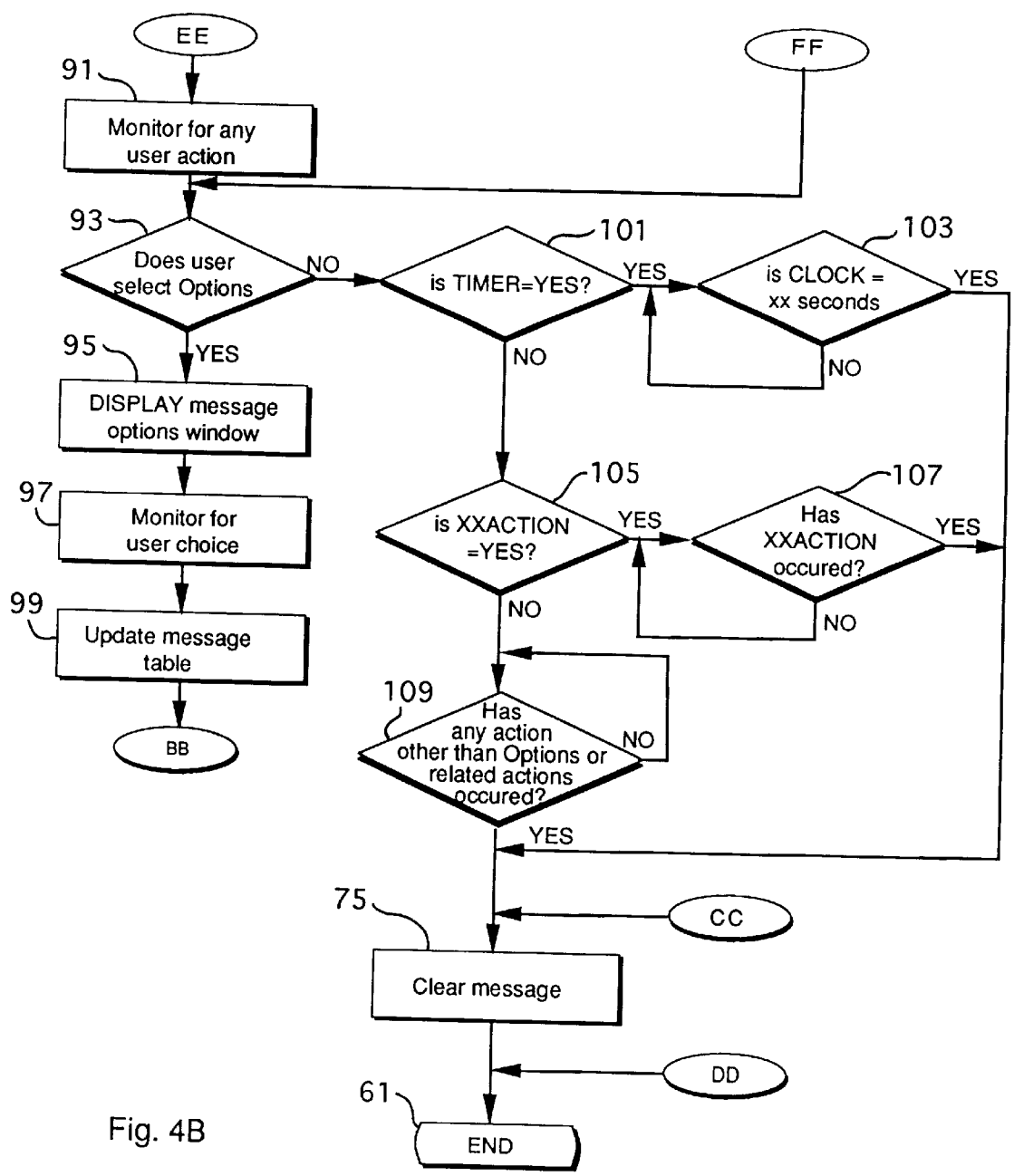

Referring to FIG. 4A, the data processing system 11 is started and initialized, step 51. Then, the user performs an action that results in a message, step 53. Such an action by the user could be sending a note to another user over the data processing system. After the action has been performed, then the method of the present invention is invoked to determine if the message that is associated with the user action detected in step 53 should be displayed, and if so, how the message is to be removed.

After the action is performed, the message that is associated with the action is found in a message table, step 55. The table, which is resident in non-volatile memory or storage, contains all of the messages in the data processing system 11. Each message may have associated with it a user option, which is stored with the messages in the table. The user options are DO NOT DISPLAY, SHOW FOR XX SECONDS, and DISPLAY MSG UNTIL XX ACTION. These options will be explained in more detail below.

After the message is found in the table, it is checked to determine if any user options are available for that particular message, step 57. If NO, then the method proceeds to step 59, wherein the default method to display and clear the message is used. The default method of removing the message would be, in the example given in FIG. 2, selecting the OK pushbutton 37. Steps 57, 59 allow specific messages to be excluded from customizing by the user. Such messages typically pertain to very hazardous situations. For example, a user could perform an action that deletes all information on the hard drive. For this type of action, the data processing system will display a message asking if the user is sure that the action is correct. The application designer has the option of not providing the method of the present invention for such a message. Thus, for an important message, the application designer can choose not to provide the OPTIONS pushbutton on the message window. After step 59, the method ends, step 61 (see FIG. 4B).

If the result of step 57 is YES, there are options available on the message, then the method proceeds to steps 63–67, wherein certain parameters are set to default values. In step 63, DISPLAY is set NO, which indicates that the message has not yet been displayed on the screen. In step 65, TIMER is set to NO, which indicates that there is no timing function to be performed. In step 67, XX ACTION is set to NO, which indicates that there is no specific action required to remove the message from the display screen. In step 69, the CLOCK is turned off.

Next, the user option associated with the specific message that may be displayed is read from the message table, step 71. The method then determines if the user option=DO NOT DISPLAY and also if DISPLAY=YES (the message has been displayed), step 73. User option=DO NOT DISPLAY if the first choice 45 of the Message Options window 43 (see FIG. 2) was selected. If the result of step 73 is YES, then the method proceeds to step 75, FIG. 4B, wherein the message is cleared or removed from the display screen 17. Then, the method ends, step 61.

If the result of step 73 is NO, then the method determines if the user option=DO NOT DISPLAY and if DISPLAY=NO (indicating that the message has not been displayed), step 77. If the result of step 77 is YES, then the method ends, step 61. This is because the message has not and will not be displayed. However, if the result of step 77 is NO, then the method determines if DISPLAY=NO in order to determine if the message has been displayed on the screen, step 78. If the result of step 78 is YES, then the method displays the message on the screen and sets DISPLAY=YES, step 79. The method then proceeds to step 80. If the result of step 78 is NO, the method skips step 79 and proceeds directly to step 80.

In step 80, the method determines if the user option= SHOW FOR XX SECONDS, which is the second choice 47 of the Message Options window 43 of FIG. 2. If the result of step 80 is YES, then TIMER is set to YES, step 81 and the CLOCK is set to ON, step 83. The method then proceeds to step 93 (FIG. 4B).

If the result of step 80 (FIG. 4A) is NO, then the method, in step 85, determines if user option=DISPLAY MSG UNTIL XX ACTION, which is the third choice 49 of FIG. 2. If the result of step 85 is YES, then XX ACTION is set to YES, step 87, and the method monitors for the specific (XX) user action, step 89. When the action XX is performed, the method proceeds to step 93. If the result of step 85 is NO, then the method monitors for any user action, step 91 (FIG. 4B).

After the appropriate user action has been detected (that is any user action from step 91 or a specific action XX from step 89), the method determines if the user selected the OPTIONS pushbutton 39, step 93. If YES, then the Message Options window 43 of FIG. 3 is displayed on the screen, step 95. Then, a user choice is monitored, step 97. When the user selects one of the choices 45, 47, 49, 50, the message table is updated, step 99, by storing the choice associated with the message 35 in the table. The message then returns to step 65 (FIG. 4A).

If the result of step 93 is NO, then the method determines if the automatic removal option 47 has been selected by determining if TIMER=YES, step 101. If YES, then the method determines if CLOCK=XX (the selected number of) seconds, step 103. If the predetermined period of XX seconds has not elapsed, a NO decision is produced in step 103 and the method merely delays by looping back and repeating step 103. When the predetermined period of time has elapsed, producing a YES decision in step 103, then the message is cleared from the screen, step 75, and the method ends, step 61.

If the automatic removal option is not selected, a NO decision in step 101, then the method determines if the specific action option 49 has been selection, step 105. If YES, then the method waits for the specific action to occur, step 107. After the specific action occurs, a YES decision in step 107, then the message is cleared from the screen, step 75.

If the user did not select the specific action option 49, then it defaults to the any action option 50. In step 109, the method determines if any action, other than options or related actions, has occurred. If NO, the method loops back to repeat step 109. Step 109 excludes specific actions from the group of actions that clears the message. Such excluded actions include the OPTIONS pushbutton 39 and related keys such as ESCAPE and CANCEL. If the user performs a non-excluded action, then the result of step 109 is YES and the message is cleared, step 75.

The operation of the present invention will now be described. In the first example, the user is presented with a message having no associated user option. This may be, for example, because the user has not seen the particular message before, or because the user has not sought to control the particular message before. The user performs an action that produces the message, step 53. Because no option is selected, the method proceeds to step 79. The method will display the message window 31, step 79 and set DISPLAY= YES. The method then proceeds to step 91, where it monitors any user action. The user can select the OK pushbutton 37 to remove the message, wherein the method proceeds to step 75 to clear the message. Alternatively, the user can control the particular message by selecting the OPTION pushbutton 39 from the window 31 (FIG. 2). This is detected in steps 91 and 93, wherein the Message Options window 43 (FIG. 3) is displayed, step 95. The user selects one of the options 45, 47, 49, 50. This choice is detected in step 97. After updating the message table, step 99, the method returns to step 65. The method proceeds through steps 65–71 where the user option is read.

If the first choice 45, DO NOT DISPLAY, is selected, then the message is cleared from the screen 17, steps 73 and 75. If the second choice 47, SHOW FOR XX SECONDS, is selected, the method proceeds through steps 80, 81 and 83 to set TIMER=YES and start the CLOCK to time the removal of the message. The method proceeds through steps 93, 101 to step 103, where the method delays until XX seconds has elapsed. The message is then deleted, step 75. If the third choice 49, DISPLAY MSG UNTIL XX ACTION, is selected, then the method proceeds through steps 85, 87 and 89, wherein XX ACTION=YES and the method monitors for the specific action. When the specific action is detected, the message is cleared, steps 93, 101, 105, 107 and 75. If the fourth choice 50, ANY ACTION WILL REMOVE MESSAGE, is selected, then the method monitors for any user action, step 91. After a user action is detected, step 91, the method proceeds through steps 93, 101, 105 to step 109, wherein the method determines if the determined action should clear the message. If so, then the message is cleared, step 75.

In the second example, the message has associated with it the user option 45 of DON'T SHOW THIS MESSAGE. When the requisite message producing action is performed by the user, step 53, the method proceeds through steps 55, 57, 63–73 and 77, wherein it is determined that the message should not be displayed. The method ends, step 61, without displaying the message.

In the last three examples, the message has associated with it a user option for removing the message. Thus, the message is displayed. This is done by the method proceeding, after the message producing action has been detected in step 53, to step 79. DISPLAY is set to YES. In the next few steps, the method determines which removal user option, 47, 49, 50 is associated with the message. In the third example, the automatic removal option 47 is selected. Thus, in step 80, the result is YES, and the method proceeds to steps 81, 83, 93, 101 to step 103. In step 103, the method delays until the predetermined amount of time, as monitored by the CLOCK, elapses. The message is then automatically cleared, step 75.

In the fourth example, the specific action option 49 is selected. The method proceeds from step 80 to step 85. In step 85, the result is YES, wherein the method monitors for the specific cation, step 89. When detected, the method proceeds through steps 93, 101 to step 105. The method verifies that the correct action has been taken, step 107 and then clears the message.

In the fifth example, the any action option 50 is selected. From step 85, the method detects any action, step 91. The method then proceeds through steps 93, 101, 105 to step 109, where the method verifies the action as being proper. Then, the message is cleared, step 75.

Figure 5:
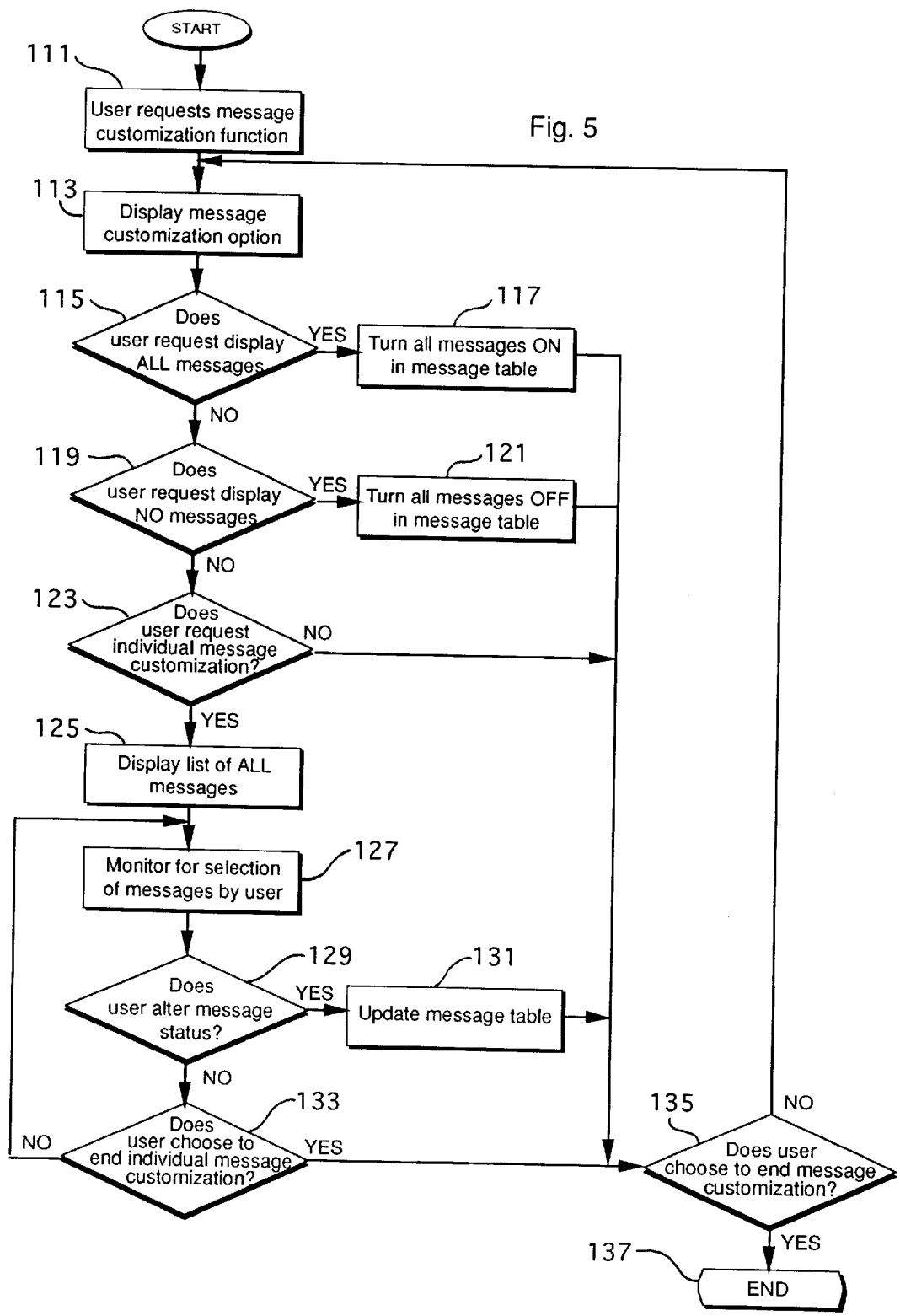

In FIG. 5, there is shown a flow chart of a method that allows a user to display a message after the DO NOT DISPLAY option 45 has been selected. This feature allows a user to recall a message to select another option.

The method is invoked whenever the user requests the message customization function, step 111. For example, the user can select the customization option from the action bar of a window. Upon selection, the message customization options are displayed, step 113. These options are TURN ALL MESSAGES ON, TURN ALL MESSAGES OFF and INDIVIDUAL MESSAGE CUSTOMIZATION. If the user selects TURN ALL MESSAGES ON, then this is detected in step 115 and all of the messages are turned on in the message table, step 117. Thus, all messages will be displayed whenever the respective message producing action occurs. If TURN ALL MESSAGES ON is selected, then each individual message is removed by performing the specific action required (for example, with the message of FIG. 2, the OK pushbutton 37 is selected to remove the message). If another method is desired, then each message is individually controlled. The method then proceeds to step 135. If the user selects TURN ALL MESSAGES OFF, then this is detected in step 119 and all of the eligible messages are turned off in the message table, step 121. Thus, whenever a message producing action occurs, the respective message will not be displayed. There are exceptions to this. Those messages which are deemed too important by the application designer to be ineligible will continue to be displayed when the appropriate message producing action occurs. After step 121, the method proceeds to step 135.

If the user selects INDIVIDUAL MESSAGE CUSTOMIZATION, then this is detected in step 123, wherein a list of all of the eligible messages is displayed, step 125. The method monitors for a message selection by the user from the displayed list, step 127. Once a user has selected a specific message from the displayed list, then the user can select one of the four options 45, 47, 49, 50 (shown in FIG. 3). The method detects if the user alters the status of the message by a selection of one of the four options, step 129. If YES, then the message table is updated, step 131. The method then proceeds to step 135. If NO, then the method determines if the user chooses to end the individual message customization, step 133. If the result of step 133 is NO, then the method loops back to step 127. If the result of step 133 is YES, then the method determines if the user chooses to end the customization of messages, step 135. If YES, then the method ends, step 137. If NO, then the method loops back to step 113.

Although the present invention has been described in conjunction with a message that is displayed, it can also be used with a message that is provided to any output device, such as a speaker.

The foregoing disclosure and the showings made in the drawings are merely illustrative of the principles of this invention and are not to be interpreted in a limiting sense.

I claim:

1. A method of controlling individual messages on a data processing system, said data processing system receiving message producing actions, comprising the steps of:

a) detecting an occurrence of a message producing action;

b) providing a message associated with said detected message producing action to a user;

c) providing to said user a selection of whether said message should be provided to said user upon future occurrences of said detected message producing action, and detecting said user selection;

d) upon detections of subsequent occurrences of said message producing action, utilizing said user selection to determine if said message is to be provided to said user;

e) the step of providing said selection of whether said message should be provided to said user further comprises the step of displaying to said user a selection of how the provision of said message to said user is to be terminated;

f) the step of displaying to said user a selection of how the provision of said message to said user is to be terminated further comprises the step of providing to said user a selection of automatically terminating, after a period of time, the provision of said message to said user.

2. The method of claim 1 wherein said step of providing to said user a selection of automatically terminating the provision of said message to said user further comprises the step of providing to said user the ability to select said period of time from a displayed prompt.

3. A method of controlling individual messages on a data processing system, said data processing system receiving message producing actions, comprising the steps of:

a) detecting an occurrence of a message producing action;

b) providing a message associated with said detected message producing action to a user;

c) providing to said user a selection of whether said message should be provided to said user upon future occurrences of said detected message producing action, and detecting said user selection;

d) upon detections of subsequent occurrences of said message producing action, utilizing said user selection to determine if said message is to be provided to said user;

e) the step of providing said selection of whether said message should be provided to said user further comprises the step of displaying to said user a selection of how the provision of said message to said user is to be terminated;

f) the step of displaying to said user a selection of how the provision of said message to said user is to be terminated further comprises the step of providing to said user a selection of terminating, upon the occurrence of any user action, the provision of said message to said user.

4. A method of controlling individual messages on a data processing system, said data processing system receiving message producing actions, comprising the steps of:

a) detecting an occurrence of a message producing action;

b) providing a message associated with said detected message producing action to a user;

c) providing to said user a selection of whether said message should be provided to said user upon future occurrences of said detected message producing action, and detecting said user selection;

d) upon detections of subsequent occurrences of said message producing action, utilizing said user selection to determine if said message is to be provided to said user;

e) the step of providing said selection of whether said message should be provided to said user further comprises the step of displaying to said user a selection of how the provision of said message to said user is to be terminated;

f) the step of providing said selection of whether said message should be provided to said user further comprises the steps of:

i) providing to said user a first selection of automatically terminating, after a period of time, the provision of said message to said user;

ii) providing to said user a selection of terminating, upon the occurrence of a selected user action, the provision of said message to said user; and iii) providing to said user a selection of terminating, upon the occurrence of any user action, the provision of said message to said user.

5. A data processing system, comprising:

a) means for detecting an occurrence of a message producing action;

b) means for providing a message associated with a detected message producing action to a user, said means for providing a message being responsive to the detection of said detected message producing action by said means for detecting;

c) means for providing to said user a selection of whether said message should be provided to said user upon future occurrences of said detected message producing action, said means for providing to said user a selection being responsive to the provision of said message to said user by said means for providing a message;

d) means for controlling said means for providing said message to said user based on said user selection;

e) said means for providing to said user a selection of whether said message should be provided to said user further comprises means for displaying to said user a selection of how the provision of said message to said user is to be terminated;

f) said means for displaying to said user a selection of how the provision of said message to said user is to be terminated further comprises means for providing to said user a selection of automatically terminating, after a period of time, the provision of said message to said user.

6. A data processing system, comprising:

a) means for detecting an occurrence of a message producing action;

b) means for providing a message associated with a detected message producing action to a user, said means for providing a message being responsive to the detection of said detected message producing action by said means for detecting;

c) means for providing to said user a selection of whether said message should be provided to said user upon future occurrences of said detected message producing action, said means for providing to said user a selection being responsive to the provision of said message to said user by said means for providing a message;

d) means for controlling said means for providing said message to said user based on said user selection;

e) said means for providing to said user a selection of whether said message should be provided to said user further comprises means for displaying to said user a selection of how the provision of said message to said user is to be terminated;

f) said means for displaying to said user a selection of how the provision of said message to said user is to be terminated further comprises means for providing to said user a selection of terminating, upon the occurrence of any user action, the provision of said message to said user.

7. A data processing system, comprising:

a) means for detecting an occurrence of a message producing action;

b) means for providing a message associated with a detected message producing action to a user, said means for providing a message being responsive to the detection of said detected message producing action by said means for detecting;

c) means for providing to said user a selection of whether said message should be provided to said user upon future occurrences of said detected message producing action, said means for providing to said user a selection being responsive to the provision of said message to said user by said means for providing a message;

d) means for controlling said means for providing said message to said user based on said user selection;

e) said means for providing to said user a selection of whether said message should be provided to said user further comprises means for displaying to said user a selection of how the provision of said message to said user is to be terminated;

f) said means for displaying to said user a selection of how the provision of said message to said user is to be terminated further comprises:
   i) means for providing to said user a selection of automatically terminating, after a period of time, the provision of said message to said user;
   ii) means for providing to said user a selection of terminating, upon the occurrence of a selected user action, the provision of said message to said user; and
   iii) means for providing to said user a selection of terminating, upon the occurrence of any user action, the provision of said message to said user.

* * * * *